United States Patent
Ma et al.

(10) Patent No.: US 10,672,269 B2
(45) Date of Patent: Jun. 2, 2020

(54) DISPLAY CONTROL ASSEMBLY AND CONTROL METHOD THEREFOR, HEAD-UP DISPLAY SYSTEM, AND VEHICLE

(71) Applicant: BOE Technology Group Co., Ltd., Beijing (CN)

(72) Inventors: Xitong Ma, Beijing (CN); Wei Wei, Beijing (CN); Naifu Wu, Beijing (CN); Han Yan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/915,330

(22) Filed: Mar. 8, 2018

(65) Prior Publication Data
US 2019/0122549 A1 Apr. 25, 2019

(30) Foreign Application Priority Data
Oct. 25, 2017 (CN) .......................... 2017 1 1009775

(51) Int. Cl.
*G08G 1/0967* (2006.01)
*G06K 9/00* (2006.01)
(Continued)

(52) U.S. Cl.
CPC ............. *G08G 1/0967* (2013.01); *B60R 1/00* (2013.01); *G02B 27/01* (2013.01); *G02B 27/0101* (2013.01); *G06K 9/00805* (2013.01); *G06K 9/00825* (2013.01); *G08G 1/09623* (2013.01); *B60R 2300/205* (2013.01); *B60R 2300/207* (2013.01); *B60R 2300/301* (2013.01); *B60R 2300/308* (2013.01); *B60R 2300/8033* (2013.01); *G02B 2027/014* (2013.01);
(Continued)

(58) Field of Classification Search
CPC ........ G08G 1/096855; B60R 2300/205; B60R 2300/308; G02B 27/01
See application file for complete search history.

(56) References Cited

U.S. PATENT DOCUMENTS

| 5,619,036 A * | 4/1997 | Salvio ....................... B60R 1/00 250/330 |
| 6,384,741 B1 * | 5/2002 | O'Leary, Sr. ............. B60R 1/00 340/905 |

(Continued)

FOREIGN PATENT DOCUMENTS

CN 104900081 A 9/2015

OTHER PUBLICATIONS

First Office Action, including Search Report, for Chinese Patent Application No. 201711009775.5, dated Sep. 5, 2019, 14 pages.

*Primary Examiner* — David N Werner
(74) *Attorney, Agent, or Firm* — Westman, Champlin & Koehler, P.A.

(57) ABSTRACT

Embodiments of the present disclosure provide a display control assembly, a control method for a display control assembly, a head-up display system, and a vehicle. The display control assembly includes a processor and a display source. The processor is configured to generate, according to driving state information of a vehicle, traffic information of an intersection to be approached by the vehicle and distance information, prompt information for indicating a driving suggestion; and the display source is configured to output the prompt information.

15 Claims, 3 Drawing Sheets

(51) Int. Cl.
*G02B 27/01* (2006.01)
*B60R 1/00* (2006.01)
*G08G 1/0962* (2006.01)
*G08G 1/0965* (2006.01)
*H04N 7/18* (2006.01)

(52) U.S. Cl.
CPC ............. *G02B 2027/0138* (2013.01); *G02B 2027/0141* (2013.01); *G08G 1/0965* (2013.01); *H04N 7/181* (2013.01)

(56) References Cited

U.S. PATENT DOCUMENTS

| | | | | |
|---|---|---|---|---|
| 9,809,165 | B1* | 11/2017 | Misu | B60Q 9/00 |
| 9,904,287 | B1* | 2/2018 | Kuffner, Jr. | G05D 1/0061 |
| 9,934,685 | B1* | 4/2018 | Bernhardt | G08G 1/095 |
| 2004/0178894 | A1* | 9/2004 | Janssen | B60K 35/00 |
| | | | | 340/435 |
| 2009/0299857 | A1* | 12/2009 | Brubaker | G06Q 30/02 |
| | | | | 705/14.66 |
| 2013/0142385 | A1* | 6/2013 | Mathieu | G01C 21/365 |
| | | | | 382/103 |
| 2015/0102154 | A1* | 4/2015 | Duncan | B64C 39/022 |
| | | | | 244/2 |
| 2015/0206432 | A1* | 7/2015 | Kuehne | G02B 27/017 |
| | | | | 345/8 |
| 2016/0023602 | A1* | 1/2016 | Krishnan | B60R 1/00 |
| | | | | 348/115 |
| 2016/0059783 | A1* | 3/2016 | Sisbot | B60R 1/001 |
| | | | | 340/901 |
| 2016/0171875 | A1* | 6/2016 | Nakfour | H04W 4/90 |
| | | | | 340/691.6 |
| 2016/0176358 | A1* | 6/2016 | Raghu | G06K 9/00798 |
| | | | | 382/104 |
| 2016/0307443 | A1* | 10/2016 | Chu | G08G 1/0145 |
| 2016/0318523 | A1* | 11/2016 | Kim | B60W 30/18018 |
| 2017/0060234 | A1* | 3/2017 | Sung | B60R 1/006 |
| 2017/0129401 | A1* | 5/2017 | Matsuoka | B60Q 9/008 |
| 2017/0187963 | A1* | 6/2017 | Lee | G06F 3/013 |
| 2017/0349098 | A1* | 12/2017 | Uhm | B60K 28/02 |
| 2018/0005526 | A1* | 1/2018 | Sendhoff | G08G 1/09623 |
| 2018/0029641 | A1* | 2/2018 | Solar | B62D 15/0275 |
| 2018/0147988 | A1* | 5/2018 | Lee | G01C 21/3697 |
| 2018/0181095 | A1* | 6/2018 | Funk | G05B 19/042 |
| 2018/0233040 | A1* | 8/2018 | Zydek | G08G 1/09623 |
| 2018/0233047 | A1* | 8/2018 | Mandeville-Clarke | B62D 15/0255 |

* cited by examiner

DISPLAY CONTROL ASSEMBLY AND CONTROL METHOD THEREFOR, HEAD-UP DISPLAY SYSTEM, AND VEHICLE

CROSS-REFERENCE TO RELATED APPLICATION

This application claims the priority benefit of Chinese Patent Application No. 201711009775.5 filed on Oct. 25, 2017 in the State Intellectual Property Office of China, the disclosure of which is incorporated herein by reference in entirety.

BACKGROUND

Technical Field

Embodiments of the present disclosure relate to the field of head-up display technology, and in particular, to a display control assembly, a control method for a display control assembly, a head-up display system, and a vehicle.

Description of the Related Art

A HUD (Head-Up Display) system is configured to directly project desired information for a driver onto a front windshield of a vehicle so that the driver can look at the front windshield horizontally without needing to lower his/her head, to obtain the desired information, thus increasing driving comfort and safety.

Due to various reasons, drivers may make a mistake in obeying traffic regulations during driving the vehicle, resulting in safety hazard in the driving, and the head-up display system in the related art can only display some basic information (such as vehicle speed), which cannot meet user's needs.

SUMMARY

The embodiments of the present disclosure provide a display control assembly, a control method for a display control assembly, a head-up display system, and a vehicle, which can at least partially solve the problem that the display control assembly can only display some basic information and thereby cannot meet user's needs.

To achieve the above objective, the embodiments of the present disclosure adopt the following technical solutions:

In a first aspect, there is provided a display control assembly, comprising:

a processor configured to generate, according to driving state information of a vehicle, traffic information of an intersection to be approached by the vehicle and distance information, prompt information for indicating a driving suggestion; and a display source configured to output the prompt information.

Optionally, the distance information comprises a distance between a zebra crossing, close to the vehicle, in the intersection to be approached by the vehicle and the vehicle, or comprises a distance between a zebra crossing, close to the vehicle, in the intersection to be approached by the vehicle and the vehicle and distances between a center position of the intersection to be approached by the vehicle and various zebra crossings of the intersection;

the traffic information comprises traffic light information and pedestrian information in front of the vehicle.

Optionally, the processor is further configured to adjust an imaging distance of the display source in real time so that the imaging distance is equal to the distance between the zebra crossing, close to the vehicle, in the intersection to be approached by the vehicle and the vehicle.

Optionally, the display control assembly further comprises:

a first communication module for receiving the driving state information;

a second communication module for receiving the traffic light information; and an information acquisition module for acquiring the distance information and/or the pedestrian information.

Optionally, the information acquisition module comprises:

a third communication module for receiving the distance information and/or the pedestrian information; or, a camera module for capturing a picture of the intersection to be approached by the vehicle, wherein the processor is further configured to obtain the distance information and/or the pedestrian information from the picture.

Optionally, the camera module comprises a first camera unit and a second camera unit, the processor is configured to obtain the distance information and/or the pedestrian information according to a first picture taken by the first camera unit and a second picture taken by the second camera unit.

Optionally, the driving state information comprises a driving speed and a driving direction; and the traffic light information comprises a light color and a remaining time;

the processor is further configured to obtain an amount of time which is to be taken by the vehicle to travel to the intersection according to the driving speed and the distance information, and generate the prompt information by comparing the amount of time with the remaining time and by referring to the driving direction and the light color.

Optionally, the processor is further configured to generate the prompt information by comparing the amount of time with the remaining time and by referring to the driving direction, the light color and the pedestrian information.

Optionally, the prompt information comprises at least one of a text, a 2D video and a 3D video.

In a second aspect, there is provided a head-up display system, comprising the display control assembly according to the first aspect.

Optionally, the head-up display system further comprises a wearable device provided with a lens.

In a third aspect, there is provided a vehicle, comprising the display control assembly according to the first aspect.

In a fourth aspect, there is provided a control method for a display control assembly, comprising:

generating, according to driving state information of a vehicle, traffic information of an intersection to be approached by the vehicle and distance information, prompt information for indicating a driving suggestion; and outputting the prompt information.

Optionally, the traffic information comprises traffic light information and pedestrian information, and the method further comprises:

receiving the driving state information and the traffic light information; and receiving the distance information and/or the pedestrian information; or capturing a picture of the intersection to be approached by the vehicle and obtaining the distance information and/or the pedestrian information from the picture.

Optionally, the control method further comprises:

adjusting an imaging distance of the prompt information in real time so that the imaging distance is equal to a distance between a zebra crossing, close to the vehicle, in the intersection to be approached by the vehicle and the vehicle.

Optionally, the step of adjusting the imaging distance of the prompt information in real time comprises:

dividing the prompt information into a left-eye picture corresponding to a left eye and a right-eye picture corresponding to a right eye; and adjusting a pixel offset of the left-eye picture and a pixel offset of the right-eye picture according to the distance between the zebra crossing, close to the vehicle, in the intersection to be approached by the vehicle and the vehicle, and complementing a non-displaying portion with a black pixel.

BRIEF DESCRIPTION OF THE DRAWINGS

In order to describe the technical solutions in the embodiments of the present disclosure or in the related art more clearly, the accompanying drawings required for describing the embodiments or the related art will be briefly introduced below. Apparently, the accompanying drawings in the following description merely represent a part of the embodiments of the present disclosure. For those skilled in the art, other drawings may still be obtained from these accompanying drawings without creative efforts.

DETAILED DESCRIPTION OF PREFERRED EMBODIMENTS

The technical solutions in the embodiments of the present disclosure will be clearly and completely described below with reference to the accompanying drawings in the embodiments of the present disclosure. Apparently, the described embodiments are only a part but not all of the embodiments of the present disclosure. All other embodiments may be obtained by those skilled in the art based on the described embodiments of the present disclosure without creative efforts, and fall within the scope of the present disclosure.

An embodiment of the present disclosure provides a display control assembly, including a processor and a display source. The processor is configured to generate prompt information for reflecting, representing or indicating a driving suggestion according to driving state information of a vehicle, traffic information at an intersection to be approached by the vehicle and distance information. The display source is configured to output the prompt information.

It should be noted that: firstly, the present disclosure is not intended to limit the acquiring manner of the driving state information of the vehicle, the traffic information at the intersection to be approached by the vehicle and the distance information.

Secondly, the processor is a control center of a server, it can be either one processor or a collection of multiple processing units. Exemplarily, the above-described processor may be a Central Processing Unit (CPU), a general purpose processor, a Digital Signal Processor (DSP), an Application-Specific Integrated Circuit (ASIC), a Field Programmable Gate Array (FPGA) or other programmable logic devices, transistor logic devices, hardware components, or any combination thereof. It can implement or perform various exemplary logic blocks, modules, and circuits described in connection with the present disclosure. The processor may also be a combination that implements computational functions, for example, a combination including one or more microprocessors, a combination including DSP and microprocessor, or the like. In an example, the processor can perform various functions of the server by running or executing a software program stored in a memory and invoking data stored in the memory.

Thirdly, the display source may output the prompt information to a screen. The screen may be for example, but not limited to, a front windshield of a vehicle or a transparent optical device disposed on the front windshield of the vehicle, for reflecting or guiding the prompt information to a driver's view; or, the prompt information may be outputted to other places where the prompt information can be shown. The embodiments of the present disclosure do not limit the output manner of the prompt information.

Fourthly, the prompt information for reflecting, representing or indicating the driving suggestion herein may be information, such as prompting passing, waiting for passing, stopping passing and the like; or may be comparing information of certain parameters, for example, displaying that the green light will turn into yellow in remaining 5 seconds, the vehicle will take 5 seconds to arrive at the zebra crossing at the current speed. The driver can select to decelerate slowly and stop at the zebra crossing or to accelerate through the zebra crossing according to the prompt information.

Fifthly, the display source described herein may be, for example, a projector, a display device, or the like.

The display control assembly according to the embodiments of the present disclosure can generate prompt information for reflecting, representing or indicating a driving suggestion according to driving state information of a vehicle, traffic information at an intersection to be approached by the vehicle and distance information, can give the driver the driving suggestion before the vehicle arrives at the intersection, thereby reducing probability of a driving behavior that violates traffic regulations.

Figure 1:
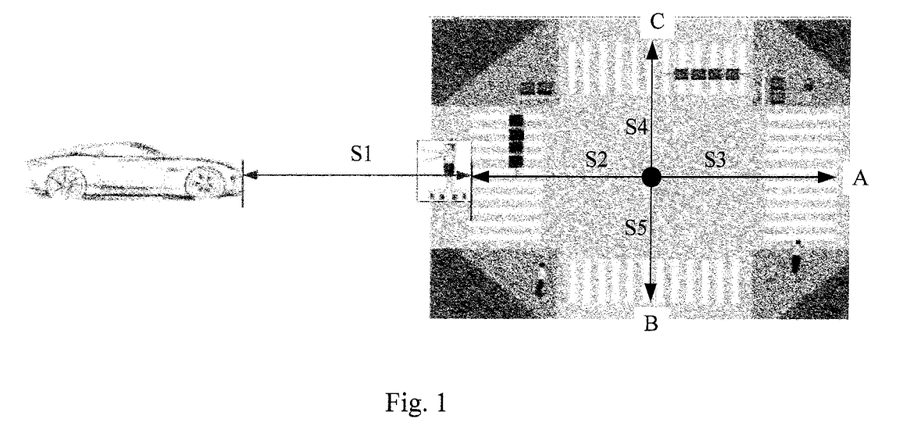
FIG. 1 is a schematic diagram showing an applicable scene of a display control assembly according to an embodiment of the present disclosure.

Optionally, as shown in FIG. 1, the distance information comprises a distance S1 between a zebra crossing, close to the vehicle, in the intersection to be approached by the vehicle and the vehicle, or comprises a distance S1 between a zebra crossing, close to the vehicle, in the intersection to be approached by the vehicle and the vehicle and distances (S2, S3, S4, S5) between a center position of the intersection to be approached by the vehicle and various zebra crossings of the intersection;

As shown in FIG. 1, according to traffic rules of daily driving, the distance is calculated herein with reference to a point on a side of the zebra crossing away from the center position of the intersection.

The driving state information includes a driving speed and a driving direction.

In an example, the driving direction may refer to, for example, going straight in the front intersection, turning left in the front intersection, or turning right in the front intersection.

The traffic information of the intersection to be approached by the vehicle includes traffic light information and pedestrian information; the traffic light information includes a light color and a remaining time.

In an example, the light color refers to, for example, a red light, a yellow light, and a green light. The remaining time refers to how long the light color will change. The pedestrian information refers to whether or not there are pedestrians on the zebra crossing in front of the vehicle.

Optionally, the above-described prompt information may be at least one of a text, a 2D video, and a 3D video.

The driving suggestion may for example consist of six states, passing, prohibiting passing, allowing to turn left, allowing to turn right, waiting for passing, and waiting for turning.

In order to enhance experience effect, the prompt information is optionally a 3D virtual traffic police image.

Optionally, the processor is further configured to adjust an imaging distance of the prompt information in real time so that the imaging distance of the display source is equal to the distance S1 between the zebra crossing, close to the vehicle, in the intersection to be approached by the vehicle and the vehicle.

That is, as shown in FIG. 1, the displayed prompt information is located at an edge of the zebra crossing, which makes the driver feel that there is a traffic police commanding traffic at the intersection.

Figure 2A:
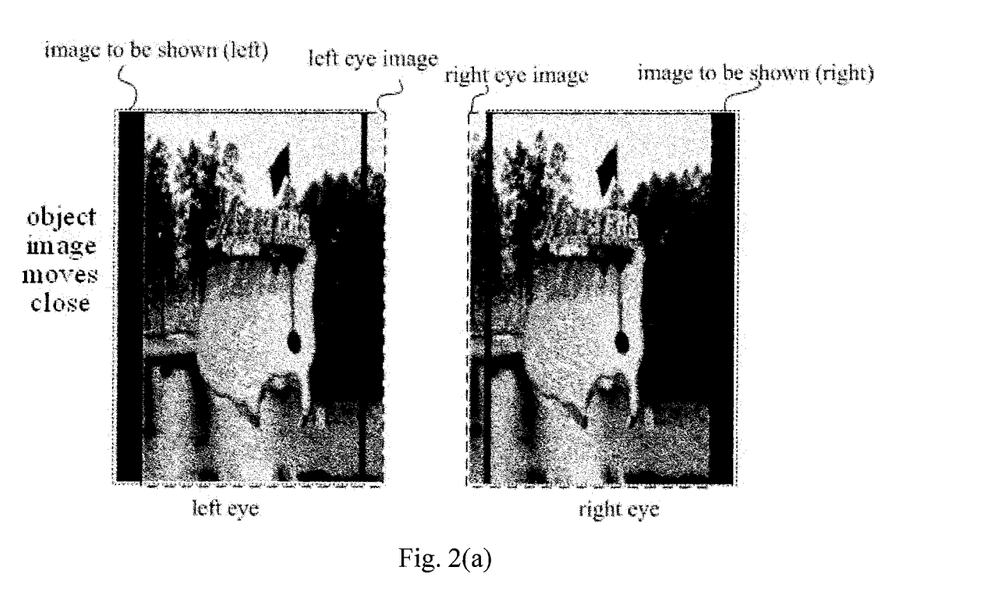
FIG. 2(a) shows an adjustment process of a pixel offset.
Figure 2B:
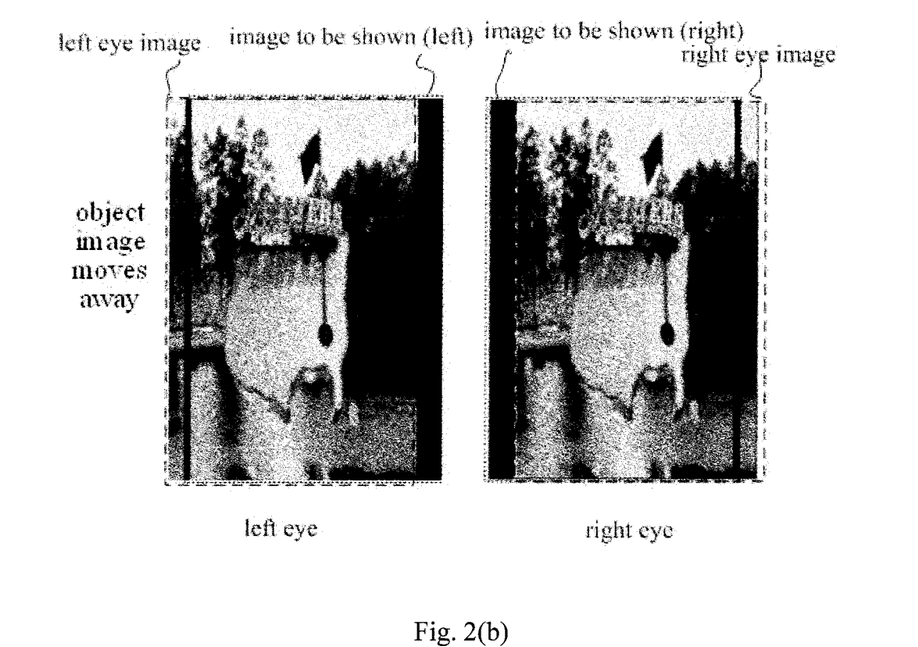
FIG. 2(b) shows another adjustment process of a pixel offset.

In an example, the adjustment of a depth of field of 3D image (imaging distance) is achieved by adjusting offsets of left and right eye images. If the left eye image is offset towards the right, the right eye image is offset towards the left, and the remaining blank areas are complemented with black pixels, then the imaging distance of the 3D image becomes smaller; if the left eye image is offset towards the left, the right eye image is offset towards the right, and the remaining blank areas are complemented with black pixels, then the imaging distance of the 3D image becomes larger. As shown in the schematic views of adjustment of the imaging distance of the 3D image in FIG. 2 (*a*) and FIG. 2 (*b*), the part in the black block is the image to be shown, that is, the image to be shown to a user. In FIG. 2 (*a*), the left eye image is offset towards the right, the remaining blank area at the left side of the left eye image is complemented with black pixels, the right eye image is offset towards the left, and the remaining blank area at the right side of the right eye image is complemented with black pixels, so that the imaging distance of the 3D image becomes smaller. In FIG. 2 (*b*), the left eye image is offset towards the left, the remaining blank area at the right side of the left eye image is complemented with black pixels, the right eye image is offset towards the right, and the remaining blank area at the left side of the right eye image is complemented with black pixels, so that the imaging distance of the 3D image becomes larger.

There is a one-to-one correspondence between the imaging distance and the pixel offset. A corresponding table between the imaging distance and the pixel offset can be obtained by measuring in advance, and then the pixel offset may be obtained from the table according to the distance S1. In this way, the image may be displayed on the edge of the zebra crossing.

Optionally, the display control assembly further includes: a first communication module for receiving the driving state information; a second communication module for receiving the traffic light information; and an information acquisition module for acquiring the distance information and/or the pedestrian information.

Specifically, the display control assembly further includes: a first communication module for receiving the driving state information; a second communication module for receiving the traffic light information; and a third communication module for receiving the distance information and/or the pedestrian information.

Herein, the third communication module for receiving the distance information and/or the pedestrian information refers to that the third communication module is configured to receive the distance information; or the third communication module is configured to receive the pedestrian information; or the third communication module is configured to receive the distance information and the pedestrian information.

The above-described communication modules may be one and the same communication module.

By way of example, the driving state information may be sent by a processor of the vehicle, the traffic light information may be sent by a traffic light management system, the distance information may be sent by a Global Positioning System (GPS), and the pedestrian information may be sent by a related sensor. The above description is only exemplary, without any limitation.

Optionally, the display control assembly further includes: a first communication module for receiving the driving state information; a second communication module for receiving the traffic light information; and a camera module for capturing a picture of the intersection to be approached by the vehicle, wherein the processor is configured to obtain the pedestrian information in front of the vehicle and the distance information from the picture.

That is, the pedestrian information and/or the distance information are obtained by the processor through processing the picture.

However, the specific installation location of the camera module is not particularly limited in the present disclosure.

Exemplarily, the camera module includes a first camera unit and a second camera unit, and the processor is configured to obtain the distance information and/or the pedestrian information in front of the vehicle according to a first picture captured by the first camera unit and a second picture captured by the second camera unit.

Figure 3:
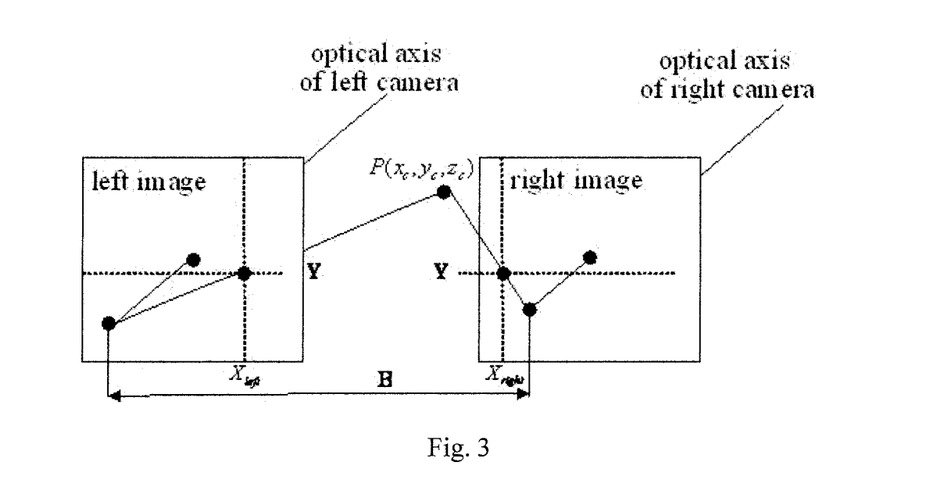
FIG. 3 is a binocular vision principle view.

That is, the distance information is acquired based on a binocular vision principle. As shown in FIG. 3, two images are captured by using two cameras, and for any point $P(x_c, y_c, z_c)$ in the intersection to be approached by the vehicle, a coordinate on the left image is $p_{left}=(X_{left}, Y_{left})$, and a coordinate on the right image is $p_{right}=(X_{right}, Y_{right})$.

If the two cameras capture the first picture and the second picture on the same plane, then the points P have the same image coordinate Y, that is, $Y_{left}=Y_{right}=Y$, and it can be concluded from the triangular geometry that:

$$\begin{cases} X_{left} = f\dfrac{x_c}{z_c} \\ X_{right} = f\dfrac{(x_c - B)}{z_c} \\ Y = f\dfrac{y_c}{z_c} \end{cases},$$

Where B is a distance between projection centers of two cameras; f is a focal length of the cameras.

Then the visual disparity is Disparity=$X_{left}$-$X_{right}$. The three-dimensional coordinate of the point P in the camera coordinate system can be calculated as:

$$\begin{cases} x_c = \frac{B * X_{left}}{\text{Disparity}} \\ y_c = \frac{B * Y}{\text{Disparity}} \\ z_c = \frac{B * f}{\text{Disparity}} \end{cases},$$

Through the above method, the coordinate of any point at the intersection to be approached by the vehicle can be obtained. Assuming that the location of the vehicle is the origin, the distance S1 between the zebra crossing, close to the vehicle, in the intersection to be approached by the vehicle and the vehicle and the distances (S2, S3, S4, S5) between the center position of the intersection to be approached by the vehicle and various zebra crossings of the intersection may be calculated.

As an example, the pedestrian information may be obtained based on pedestrian detection technology. Pedestrian detection technology operates based on acquisition of picture, image processing and algorithms related to computer vision, judges from the picture whether or not there is a pedestrian and finds the location of the pedestrian, and further identifies actions and postures of the pedestrian.

Optionally, the processor is configured to obtain an amount of time which is to be taken by the vehicle to travel to the intersection to be approached by the vehicle according to the driving speed of the vehicle and the distance information, and generate the prompt information by comparing the amount of time with the remaining time according to the driving direction and the light color.

As an example, the reference information required for the processor to generate the prompt information includes:

1) the distance S1 between the vehicle and the zebra crossing, which is nearest to the vehicle, in the intersection to be approached by the vehicle;
2) the driving speed V of the vehicle;
3) the driving direction of the vehicle;
4) the color of the traffic light being lit; and
5) the remaining time T after which the traffic light being lit will be changed.

Through the distance S1 and the driving speed V, a time T' required for the vehicle to travel to the nearest zebra crossing can be obtained as T'=S1/V.

In the case where the vehicle intends to go straight:

In case of red light being lit, if T≤T', the vehicle is allowed to pass through the intersection; if T>T', passing of the vehicle is prohibited;

Herein, the remaining time of the red light is 2S, but the vehicle will take 5 seconds to arrive at the intersection. Therefore when the vehicle arrives at the intersection, the lit light would turn into green, thus the vehicle is allowed to pass through the intersection;

In case of green light being light, if T≥T', the vehicle is allowed to pass through the intersection; if T<T', passing of the vehicle is prohibited; and In case of yellow light being lit, passing of the vehicle is prohibited.

In the case where the vehicle intends to turn right: the vehicle is allowed to turn right.

In the case where the vehicle intends to turn left:

In case of red light being lit, if T≤T', the vehicle is allowed to pass through the intersection; if T>T', passing of the vehicle is prohibited;

In case of green light being lit, if T≥T', the vehicle is allowed to turn left; if T<T', passing of the vehicle is prohibited; and In case of yellow light being lit, passing of the vehicle is prohibited.

In order to improve safety performance, as another example, the reference information required for the processor to generate the prompt information includes:

1) the distance S1 between the vehicle and the zebra crossing, which is nearest to the vehicle, in the intersection to be approached by the vehicle; the distances (S2, S3, S4, S5) between the center position of the intersection to be approached by the vehicle and various zebra crossings of the intersection;
2) the driving speed V of the vehicle;
3) the driving direction of the vehicle;
4) the pedestrian information in front of the vehicle;
5) the color of the traffic light being lit; and
6) the remaining time T after which the traffic light being lit will be changed.

Exemplarily, as shown in FIG. 1 and Table 1, in the case where the vehicle intends to go straight:

A time T' required for the vehicle to travel to the point A through the front intersection is calculated as T'=(S1+S2+S3)/V;

In case of red light being lit, passing of the vehicle is prohibited;

In case of green light being lit, if T≥T' and no pedestrian is in front of the vehicle, the vehicle is allowed to pass through the intersection; if T≥T' and there are pedestrians in front of the vehicle, the vehicle needs to wait for passing; if T<T', passing of the vehicle is prohibited; and In case of yellow light being lit, passing of the vehicle is prohibited.

In the case where the vehicle intends to turn right:

A time T' required for the vehicle to travel to the point B through the front intersection is calculated as T'=(S1+S2+S5)/V;

If no pedestrian is in front of the vehicle, the vehicle is allowed to turn right; if there are pedestrians in front of the vehicle, the vehicle needs to wait for turning.

In the case where the vehicle intends to turn left:

A time T' required for the vehicle to travel to the point C through the front intersection is calculated as T'=(S1+S2+S4)/V;

In case of red light being lit, passing of the vehicle is prohibited;

In case of green light being lit, if T≥T' and no pedestrian is in front of the vehicle, the vehicle is allowed to turn left; if T≥T' and there are pedestrians in front of the vehicle, the vehicle needs to wait for turning; if T<T', passing of the vehicle is prohibited; and In case of yellow light being lit, passing of the vehicle is prohibited.

It should be noted that, the above-described generation manner of the prompt information is merely a kind of illustration but is not limitative. Other reference information may be further incorporated. Considering the safety factor, it is recommended that going straight and turning left are prohibited if the yellow light is on. However, the remaining time T can be compared with the above T' when the yellow light is on, as the case where the green light lit, and then the prompt information is generated after the comparison. Of course, the above prompt information may change as the vehicle moves.

Alternatively, the traffic information includes traffic light information and pedestrian information; and the method further includes: receiving the driving state information and the traffic light information; capturing a picture of the

TABLE 1

Corresponding Table for Prompt Information

| | | Traffic light | | | | | |
|---|---|---|---|---|---|---|---|
| | | Red light | | Green light | | Yellow light | |
| Pedestrian | | Yes | No | Yes | No | Yes | No |
| Driving direction | Turn left | Prohibit passing | Prohibit passing | Wait for turning | If T ≥ T', allow to turn left; If T < T', prohibit passing | Prohibit passing | Prohibit passing |
| | Turn right | Wait for turning | Allow to turn right | Wait for turning | Allow to turn right | Wait for turning | Allow to turn right |
| | Go straight | Prohibit passing | Prohibit passing | Wait for passing | If T ≥ T', allow to pass; If T < T', prohibit passing | Prohibit passing | Prohibit passing |

Figure 4:
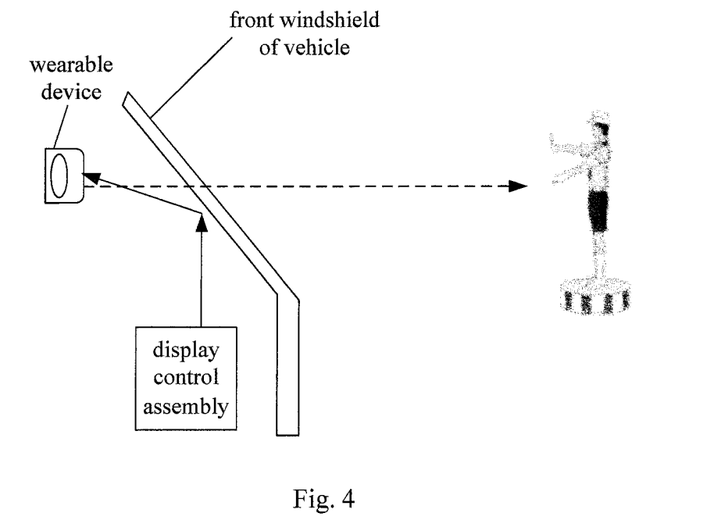
FIG. 4 is a head-up display system according to an embodiment of the present disclosure.

An embodiment of the present disclosure further provides a head-up display system, as shown in FIG. 4, including the above display control assembly, and further includes a wearable device provided with a lens.

FIG. 4 schematically shows a screen as a front windshield of the vehicle.

Herein, the lens of the wearable device may include for example a left lens and a right lens whose polarizing directions are perpendicular to each other.

An embodiment of the present disclosure also provides a vehicle including the above display control assembly.

In the vehicle according to the embodiment of the present disclosure, the HUD is provided in the vehicle, and the HUD includes the above display control assembly.

When the vehicle approaches to the intersection to be approached, the HUD can generate a driving suggestion based on a variety of information such as pedestrian information on the zebra crossing and the traffic light information. For example, a prompt may be shown to the driver by virtualizing a traffic police image at the edge of the zebra crossing and making the traffic police image give an instruction gesture.

Figure 5:
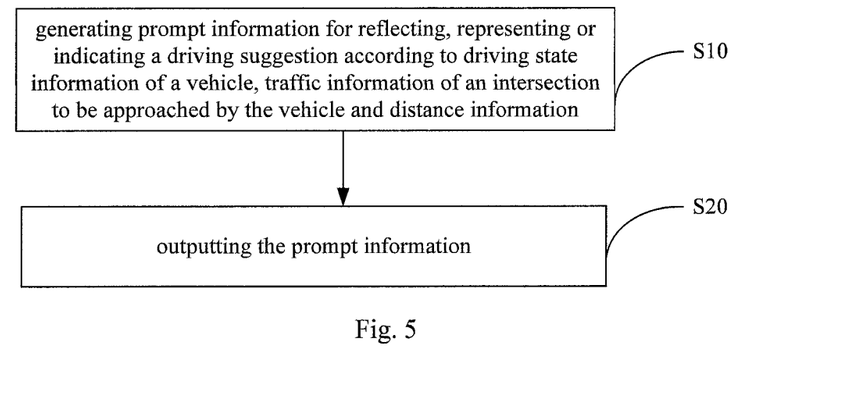
FIG. 5 a control method for a display control assembly according to an embodiment of the present disclosure.

An embodiment of the present disclosure further provides a control method for a display control assembly, as shown in FIG. 5, the method includes following steps:

Step S10: generating prompt information for reflecting, representing or indicating a driving suggestion according to driving state information of a vehicle, traffic information of an intersection to be approached by the vehicle and distance information.

The above information may be received by the display control assembly from a device with which the display control assembly is in communication connection, or may be determined by the display control assembly by capturing information of the surrounding environment.

Step S20: outputting the prompt information.

Further, the traffic information includes traffic light information and pedestrian information; and the method further includes: receiving the driving state information, the traffic light information, the distance information, and/or pedestrian information.

intersection to be approached by the vehicle and obtaining the distance information and/or the pedestrian information from the picture.

Further, the method further includes:

adjusting an imaging distance of the prompt information in real time so that the imaging distance of the display source is equal to a distance S1 between a zebra crossing, close to the vehicle, in the intersection to be approached by the vehicle and the vehicle.

That is, the virtual image of the prompt information is shown at the edge of the zebra crossing.

Specifically, adjusting the imaging distance of the prompt information in real time comprises:

dividing the prompt information into a left-eye picture corresponding to a left eye and a right-eye picture corresponding to a right eye; and adjusting a pixel offset of the left-eye picture and a pixel offset of the right-eye picture according to the distance S1 between the zebra crossing, close to the vehicle, in the intersection to be approached by the vehicle and the vehicle, and complementing a pixel not displaying any picture with a black color.

The correspondence between the pixel offset and the distance S1 may be measured in advance to generate a table, and the adjustment may be performed according to the table.

Through the description of the above embodiments, it may be appreciated by those skilled in the art that, for the purpose of description and simplicity, the foregoing functional modules and the division thereof are merely exemplarily described. In practice, the foregoing functions may be assigned to be achieved by different functional modules as needed, i.e., the internal structure of the apparatus is divided into different functional modules to complete all or part of the functions described above.

In the several embodiments of the present disclosure, it should be understood that the disclosed apparatus and method may be implemented in other manners. For example, the apparatus embodiments described above are merely exemplary. For example, the division of modules or units is merely a logical function division and they may be divided by other ways in actual implementation. For example, a plurality of units or assemblies may be combined or may be integrated into another apparatus, or some of features may be ignored or not performed. In addition, the shown or discussed mutual coupling or direct coupling or communication connection may be an indirect coupling or communication connection through some interfaces, devices or units, and may be in an electrical form, a mechanical form or other forms.

The units described as separate components may or may not be physically separated. The component displayed as a unit may be one physical unit or multiple physical units, that is, may be located in one place or may also be distributed in multiple different places. Some or all of the units may be selected according to actual needs to achieve the objective of the solution of the embodiment.

In addition, all the functional units in the embodiments of the present disclosure may be integrated in one processing unit, or each of the units may exist in physical separately, or two or more units may be integrated in one unit. The above integrated unit can be implemented in the form of hardware or in the form of software functional unit.

If the integrated unit is implemented in the form of software functional unit and is sold or used as an independent product, the integrated unit may be stored in a readable storage medium. Based on this, the technical solutions of the embodiments of the present disclosure, or the part contributing to the related art, or all or part of the technical solutions may be embodied in the form of a software product, the software product is stored in a storage medium, includes several instructions for allowing a device (which may be a single-chip microcomputer, a chip, etc.) or a processor to execute all or part of the steps of the method according to various embodiments of the present disclosure. The foregoing storage medium includes various media capable of storing program code, such as a USB flash disk, a removable hard disk, a read-only memory (ROM), a random access memory (RAM), a magnetic disk, an optical disk and the like.

The embodiments of the present disclosure provide a display control assembly, a control method for a display control assembly, a head-up display system, and a vehicle, prompt information for reflecting, representing or indicating a driving suggestion can be generated according to driving state information of a vehicle, traffic information of an intersection to be approached by the vehicle and distance information, the driving suggestion can be given to the driver before the vehicle arrives at the intersection, thereby reducing probability of a driving behavior that violates traffic regulations.

The above described contents are merely specific embodiments of the present disclosure, but the scope of the present disclosure is not limited thereto. Any changes or replacements within the technical scope disclosed in the present disclosure should fall within the scope of the present disclosure. Therefore, the scope of the present disclosure should be defined by the claims and equivalents thereof.

What is claimed is:

1. A display control assembly, comprising:
a processor configured to generate, according to driving state information of a vehicle, traffic information of an intersection to be approached by the vehicle and distance information, prompt information for indicating a driving suggestion; and
a display source configured to output the prompt information,
wherein the distance information comprises a distance between a zebra crossing, close to the vehicle, in the intersection to be approached by the vehicle and the vehicle, or comprises a distance between a zebra crossing, close to the vehicle, in the intersection to be approached by the vehicle and the vehicle and distances between a center position of the intersection to be approached by the vehicle and various zebra crossings of the intersection,
wherein the traffic information comprises traffic light information and pedestrian information in front of the vehicle,
wherein the driving state information comprises a driving speed and a driving direction; and the traffic light information comprises a light color and a remaining time;
the processor is further configured to obtain an amount of time which is to be taken by the vehicle to travel to the intersection according to the driving speed and the distance information, and generate the prompt information by comparing the amount of time with the remaining time and by referring to the driving direction and the light color,
wherein the processor is further configured to generate the prompt information by comparing the amount of time with the remaining time and by referring to the driving direction, the light color and the pedestrian information,
wherein the prompt information comprises a virtual traffic police image, to make a driver feel that there is a traffic police commanding traffic at the intersection.

2. The display control assembly according to claim 1, wherein the processor is further configured to adjust an imaging distance of the display source in real time so that the imaging distance is equal to the distance between the zebra crossing, close to the vehicle, in the intersection to be approached by the vehicle and the vehicle.

3. A head-up display system, comprising the display control assembly according to claim 2.

4. A vehicle, comprising the display control assembly according to claim 2.

5. The display control assembly according to claim 1, wherein the display control assembly further comprises:
a first communication module for receiving the driving state information;
a second communication module for receiving the traffic light information; and
an information acquisition module for acquiring the distance information and/or the pedestrian information.

6. The display control assembly according to claim 5, wherein the information acquisition module comprises:
a third communication module for receiving the distance information and/or the pedestrian information; or,
a camera module for capturing a picture of the intersection to be approached by the vehicle, wherein the processor is further configured to obtain the distance information and/or the pedestrian information from the picture.

7. The display control assembly according to claim 6, wherein the camera module comprises a first camera unit and a second camera unit,
the processor is configured to obtain the distance information and/or the pedestrian information according to a first picture taken by the first camera unit and a second picture taken by the second camera unit.

8. The display control assembly according to claim 1, wherein the prompt information further comprises at least one of a text, a 2D video or a 3D video.

9. A head-up display system, comprising the display control assembly according to claim 1.

10. The head-up display system according to claim 9, further comprising a wearable device provided with a lens.

11. A vehicle, comprising the display control assembly according to claim 1.

12. A control method for a display control assembly, comprising:
generating, according to driving state information of a vehicle, traffic information of an intersection to be approached by the vehicle and distance information, prompt information for indicating a driving suggestion; and
outputting the prompt information,
wherein the distance information comprises a distance between a zebra crossing, close to the vehicle, in the intersection to be approached by the vehicle and the vehicle, or comprises a distance between a zebra crossing, close to the vehicle, in the intersection to be approached by the vehicle and the vehicle and distances between a center position of the intersection to be approached by the vehicle and various zebra crossings of the intersection,
wherein the traffic information comprises traffic light information and pedestrian information in front of the vehicle,
wherein the driving state information comprises a driving speed and a driving direction; and the traffic light information comprises a light color and a remaining time;
wherein the control method further comprises:
obtaining an amount of time which is to be taken by the vehicle to travel to the intersection according to the driving speed and the distance information, and generating the prompt driving direction and the light color,
generating the prompt information by comparing the amount of time with the remaining time and by referring to the driving direction, the light color and the pedestrian information,
wherein the prompt information comprises a virtual traffic police image, to make a driver feel that there is a traffic police commanding traffic at the intersection.

13. The control method according to claim 12, wherein the traffic information comprises traffic light information and pedestrian information, and the method further comprises:
receiving the driving state information and the traffic light information; and,
receiving the distance information and/or the pedestrian information; or capturing a picture of the intersection to be approached by the vehicle and obtaining the distance information and/or the pedestrian information from the picture.

14. The control method according to claim 12, further comprising:
adjusting an imaging distance of the prompt information in real time so that the imaging distance is equal to the distance between the zebra crossing, close to the vehicle, in the intersection to be approached by the vehicle and the vehicle.

15. The control method according to claim 14, wherein the step of adjusting the imaging distance of the prompt information in real time comprises:
dividing the prompt information into a left-eye picture corresponding to a left eye and a right-eye picture corresponding to a right eye; and
adjusting a pixel offset of the left-eye picture and a pixel offset of the right-eye picture according to the distance between the zebra crossing, close to the vehicle, in the intersection to be approached by the vehicle and the vehicle, and complementing a non-displaying portion with a black pixel.

* * * * *